US009416579B2

(12) United States Patent
Rejc (10) Patent No.: US 9,416,579 B2
(45) Date of Patent: Aug. 16, 2016

(54) DRIVE AND CONTROL SYSTEM FOR LIFTING GATES (71) Applicant: GABRIJEL REJC GMBH & CO. KG, Landshut (DE)

(72) Inventor: Gabrijel Rejc, Landshut (DE)

(73) Assignee: Gabrijel Rejc GMBH & Co. KG (DE)

( * ) Notice: Subject to any disclaimer, the term of this patent is extended or adjusted under 35 U.S.C. 154(b) by 0 days.

(21) Appl. No.: 14/576,428

(22) Filed: Dec. 19, 2014

(65) Prior Publication Data
US 2015/0176321 A1 Jun. 25, 2015

(51) Int. Cl.
E05F 15/70 (2015.01)
E06B 9/84 (2006.01)
H02P 3/08 (2006.01)
E05F 15/40 (2015.01)
E05F 15/603 (2015.01)
E05F 15/72 (2015.01)

(52) U.S. Cl.
CPC ............... *E05F 15/70* (2015.01); *E05F 15/40* (2015.01); *E05F 15/603* (2015.01); *E05F 15/72* (2015.01); *E06B 9/84* (2013.01); *H02P 3/08* (2013.01); *E05Y 2900/00* (2013.01); *E05Y 2900/106* (2013.01)

(58) Field of Classification Search
CPC ......... E05F 15/00; E05F 15/40; E05F 15/603; E05F 15/665; E05F 15/668; E05F 15/72; E05D 13/003; E06B 9/84
See application file for complete search history.

(56) References Cited

U.S. PATENT DOCUMENTS

| 5,831,403 | A | * | 11/1998 | Kanki et al. | 318/286 |
| 6,092,338 | A | * | 7/2000 | Crowner et al. | 49/360 |
| 6,137,251 | A | * | 10/2000 | Huang et al. | 318/400.12 |
| 6,172,475 | B1 | * | 1/2001 | Fitzgibbon et al. | 318/266 |
| 7,064,505 | B2 | * | 6/2006 | Sato | 318/266 |
| 7,208,897 | B2 | * | 4/2007 | Hotto et al. | 318/466 |
| 7,212,897 | B2 | * | 5/2007 | Suzuki et | 701/49 |
| 7,723,936 | B2 | * | 5/2010 | Schaefer | 318/362 |
| 7,941,972 | B2 | * | 5/2011 | Kamiya et al. | 49/360 |
| 8,026,809 | B2 | * | 9/2011 | Schafer et al. | 340/540 |
| 8,169,169 | B2 | * | 5/2012 | Hass et al. | 318/286 |
| 2011/0271595 | A1 | * | 11/2011 | Eggeling et al. | 49/358 |
| 2014/0117757 | A1 | * | 5/2014 | Tsui et al. | 307/23 |

* cited by examiner

*Primary Examiner* — David E Allred
*Assistant Examiner* — Catherine A Kelly
(74) *Attorney, Agent, or Firm* — Hahn, Loeser & Parks, LLP; Arland T. Stein; Mark N. Kittel (57) ABSTRACT

The present invention provides a drive unit for high-speed lifting gates in which a drive motor is provided for moving the gate leaf and can be down-regulated up to zero rotational speed. The drive motor is actuated via a control unit. Following the occurrence of an emergency stop condition, the drive motor is actuated such that its rotational speed is reduced to zero in a controlled manner and the gate leaf is thereby braked in a motor-driven manner. When the gate leaf is at a standstill, the gate leaf is held by the energized drive motor at zero rotational speed at the holding position. It is with an emergency power supply ensured that, also in the event of a power failure, motor-driven deceleration of the gate leaf and an emergency opening can occur.

7 Claims, 6 Drawing Sheets

DRIVE AND CONTROL SYSTEM FOR LIFTING GATES

CROSS REFERENCE TO RELATED APPLICATIONS

This application claims priority to European Patent Application No. 13199339.6 filed Dec. 23, 2013, which is incorporated herein by reference in its entirety.

BACKGROUND AND SUMMARY

The present invention relates to drive and control systems for lifting gates, in particular for high-speed industrial lifting gates as well as a lifting gate with such a drive and control system.

Lifting gates are in prior art known for example from DE 40 15 214 A1 in which a lifting gate is disclosed with slatted armor and an electric drive motor. This lifting gate comprises two guide tracks which are arranged on the two opposite sides of the gate opening, and slatted armor with slats that are mounted on hinge straps spaced from each other in such a manner that the hinge pins engage within a space between the adjacent slats. It is further disclosed that the lifting gate is formed as an industrial lifting gate within the meaning of a high-speed gate. Such lifting gates are designed as rolling gates or spiral gates that close or open walk-in or drive-in gate openings.

For gates that need to have the gate leaf moved vertically for opening the drive-through or walk-through passage, there is the danger that it cannot be excluded in the event of failure of a servo or actuating member that the gate leaf crashes down in an uncontrolled and hazardous manner due to the gravity load on the gate leaf. These dangers are greater the faster the gate leaf is moved during regular operation. In so-called high-speed gates, gate leaf speeds of up to 4 m/s can be reached, whereas the gate leaves with conventional industrial lifting gates are moved at speeds of typically 0.2-0.3 m/s.

Elaborate measures are taken to minimize the hazard posed by these gates.

A common measure is to balance the weight of the gate leaf by counterweights or weight counterbalancing springs, in order to create a balancing system that is ideally configured such that the gate leaf is balanced in every position of the gate leaf by the balancing system, thereby avoiding hazardous lag.

Practice shows that this can not be realized in the way in that balancing can not be given uniformly at all positions of the gate leaf and not for the entire service life. With tension springs, for example, the spring characteristic changes over time so that the balancing moment required can not be guaranteed in the long run.

Also crashing devices based on centrifugal actuation are known that respond to an increase in the lowering speed of the gate leaf. Centrifugal actuation, however, responds only relatively slowly and can therefore be used only for low closing speeds. At higher closing speeds, the lag distance of the gate leaf would be hazardous and the load on the mechanical components would be relatively high.

The same applies to so-called transmission breakage protection devices that are constructed such that, upon loss of power transmission between the individual gear elements, holding jaws engages with the main gear of the transmission.

With conventional lifting gates, asynchronous motors are employed with worm, bevel, and spur gear transmissions and in combination with mechanical brakes. Transmissions and brakes are subject to permanent wear. Stresses arise not only from normal operation of the gate systems, but most of all also from the measures initiated in case of danger, such as safety reversal or an emergency stop. Safety reversals triggered by safety sensors, such as shut-off bars or light barriers, must within the shortest possible time cause the gate leaf to come to a standstill with subsequent reversal of the gate leaf direction in order to limit contact forces upon human body parts. Emergency stop processes lead to a stop in the shortest time. Power failures lead to an instantaneous emergency stop.

As explained above, power failure is for the conventional design of the gates the situation which puts the highest loads on the transmission of the gate drive and the holding brake. The drive power is in an instant no longer present, the brake operated in the closed-circuit principle is actuated instantaneously and must not only absorb gravitational forces but also the kinetic energy of the gate leaf mass. The loads on gears and shafts as well as other parts of the support system increase at a square function of the closing speed.

Brakes commonly being attached to the motor shaft ensure that the gate leaf is held in position after the drive is switched off. These brakes operated in a closed-circuit principle are subjected to high loads, in particular in the event of power failure, because they have to absorb the kinetic energy of the gate leaf weight instantaneously and in an uncontrolled manner. The design complexity of such safety-related mechanical brakes that can also make power failure manageable is correspondingly high.

In addition, the braking effect of such brakes is dependent on several factors, such as the operating temperature or possible fouling. Typically, the braking effect of the brakes abruptly decreases at about 150° C. Any fouling of the brake discs with oily substances also reduces the braking effect dramatically.

The adjusting range of asynchronous motors, i.e. the ratio of the rated rotational speed and the lowest rotational speed at which the drive can still maintain the nominal speed is limited. The required moment of force is therefore at low rotational speeds not available and also the reaction time of the brake is to be considered, so that the brakes must be activated already prior to the standstill. The kinetic energy to be absorbed by the brake arising there leads to great wear.

Due to these stresses, the brakes are to be tested at least annually and in dependence of the number of actuations. Safety experts recommend to unconditionally replace brakes at the latest after 2,000 full load actuations caused by emergency stop actuations or power failures.

In order to enable the gate to be opened also after power failure, the electromechanical holding brakes employed are equipped with manually operated elements such as cable winches, cranks or manual chains which cancel the effect of the holding brake when used. The gate leaf thereby is either raised by the weight counterbalancing device, can be pushed up, or be rolled upwardly by operating a crank or a hand chain.

In general, the asynchronous motors are operated on gates by use of frequency converters enabling the most uniform acceleration of the gate leaf. During the downward motion induced by gravity or during reversal operations of the gate leaf, the motor is in a generator mode. Frequency converters usually require a so-called braking resistor in which this regenerative energy is depleted, i.e. is converted into heat energy.

The object of the present invention is to overcome these disadvantages and to provide an improved drive and control system for lifting gates in order to reduce the crash risk and the stresses on gears, shafts, brakes and weight counterbalancing devices.

This is satisfied by the features of the independent claim. Advantageous embodiments are the object of the dependent claims. It is the particular approach of the present invention to replace the asynchronous motor with an attached brake conventionally used as a drive with a motor, which with the use of appropriate control and regulating devices is able to decelerate the gate leaf of the lifting gate in a motor-driven manner to zero speed and hold it at a standstill in this position.

According to a first aspect of the present invention, a drive system is provided for a lifting gate with a vertically movable gate leaf. The drive system comprises a drive motor connectable to the gate leaf which is adapted to move the gate leaf vertically and a control system for actuating the drive motor. The drive system is characterized in that the drive motor can be down-regulated up to zero rotational speed and the control unit is upon the occurrence of a stop condition adapted to actuate the drive motor such that its rotational speed is reduced in a controlled manner and the gate leaf is thereby braked in a motor-driven manner, where the drive motor is configured to provide sufficient torque at zero rotational speed to hold the gate leaf at a current position, and the control system is configured to ensure this also during power failure.

According to a second aspect of the present invention, a lifting gate is provided with a vertically movable gate leaf and a drive system according to the first aspect of the invention.

The drive motor can advantageously be coupled to the gate leaf directly, in particular without gearing. This reduces structurally complex gearing units prone to wear and defect.

The drive motor can advantageously be formed as a synchronous motor. Synchronous motors are characterized as being highly regulatable and robust. They deliver high torques at small dimensions so that they can optionally be configured without transmission gearings such that their torque is sufficient for customary gate leaf weights.

In addition, synchronous motors, in contrast to conventional asynchronous motors, can be operated in current regulating mode, so that controlled operation is given up to zero rotational speed and even when stalled (zero rotational speed), sufficiently high torque can be generated to hold the gate leaf at a standstill against the force of gravity.

In a further favorable embodiment, the drive system further comprises an electrical energy storage, preferably in the form of an accumulator unit that is adapted to supply the drive motor and the control unit with electrical energy in case of power failure. Advantageously, the control unit can there be configured to detect power failure and to interpret this as an emergency condition so that the drive motor is in the event of power failure capable to reduce the speed and hold the gate leaf at a standstill. Weight-counterbalancing the gate leaf can in this manner also be dispensed with.

The synchronous drive can optionally be configured such that it can move the gate leaf even without the use of weight counterbalancing systems. At the same time, the power regulation of the synchronous drive can recuperate the freed energy released during braking and/or when closing the gate, for example, in a rechargeable accumulator unit or a capacitor unit. The design complexity associated with the weight counterbalancing systems can therefore also be reduced without increasing the load on mechanical supports or compromising safety.

In addition, the control unit can further be adapted to enable an emergency operation of the lifting gate in the event of power failure, in particular actuate the drive motor for an emergency opening of the lifting gate. The electrical energy storage thereby enables an emergency operation.

The drive system can advantageous further comprise a power regulating unit for actuating the drive motor, where the power regulating unit is adapted to recuperate the electrical energy generated during motor-driven deceleration of the gate and to charge the electrical energy storage with the recuperated energy. In this way, driving the lifting gate can be effected in an extremely energy-efficient manner, a characteristic that can be of importance in particular during accumulator-based emergency operations.

The control unit can advantageously further be adapted to determine an actual value on the basis of a signal supplied by the position sensor indicating a position or position change of the lifting gate, and to actuate the drive motor based on a comparison of the actual value with a reference value. It is in this manner possible to enable precise regulation of the gate motion. Based on a comparison of a reference value to an actual value, a reaction can in the event of deviation occur in the form of a motion interruption.

In a further advantageous embodiment, the control unit can monitor the residual accumulator charge and, when a predetermined lower threshold is reached, drive the gate leaf into a secure and crash-safe position with the remainder of the energy. A further accumulator unit, provided as a redundant protection, can provide this energy. In an alternative embodiment, a mechanical brake can assume the function of this redundant protection. In the event that the gate leaf remains in the stop position for a long time, the brake can for reasons of energy savings be switched to be activated.

It can by use of position sensor readings be verified whether the holding position is maintained in a stable manner. If it is determined that the holding position is not maintained, then the drive motor is again energized for bringing about renewed holding at zero rotational speed or driving to a secure crash-safe position. In this case, a warning to inspect and repair the brakes can also be outputted.

BRIEF DESCRIPTION OF THE DRAWINGS

The invention is described below with reference to the accompanying drawings, in which.

DETAILED DESCRIPTION OF THE DRAWINGS

In a drive and control system for lifting gates according to the invention, the combination of an asynchronous motor with a gear unit and a mechanically loaded brake conventionally used is replaced with an electric motor, preferably configured as a synchronous motor, which is optionally connected to the gate leaf directly and without any elaborate transmission gearing. A control unit is provided with a corresponding power regulating unit for actuating the motor. The motor is there configured both to move the gate leaf during regular operation, as well as to also brake the gate leaf in the shortest possible time in the event of an emergency stop and to hold it at the current position.

The risk of crashing down due to gear breakage in conventional drives is thereby eliminated just like the additional complexity associated with conventional gear failure protection.

Brake devices prone to wear in conventional drives can be completely omitted or be replaced with brakes that are structurally less complex or have reduced power.

The gate can also be held in a position optionally without the aid of mechanical holding devices. This, however, does not exclude that after the motor temporarily holds it, a mechanical holding device can later engage.

Figure 1:
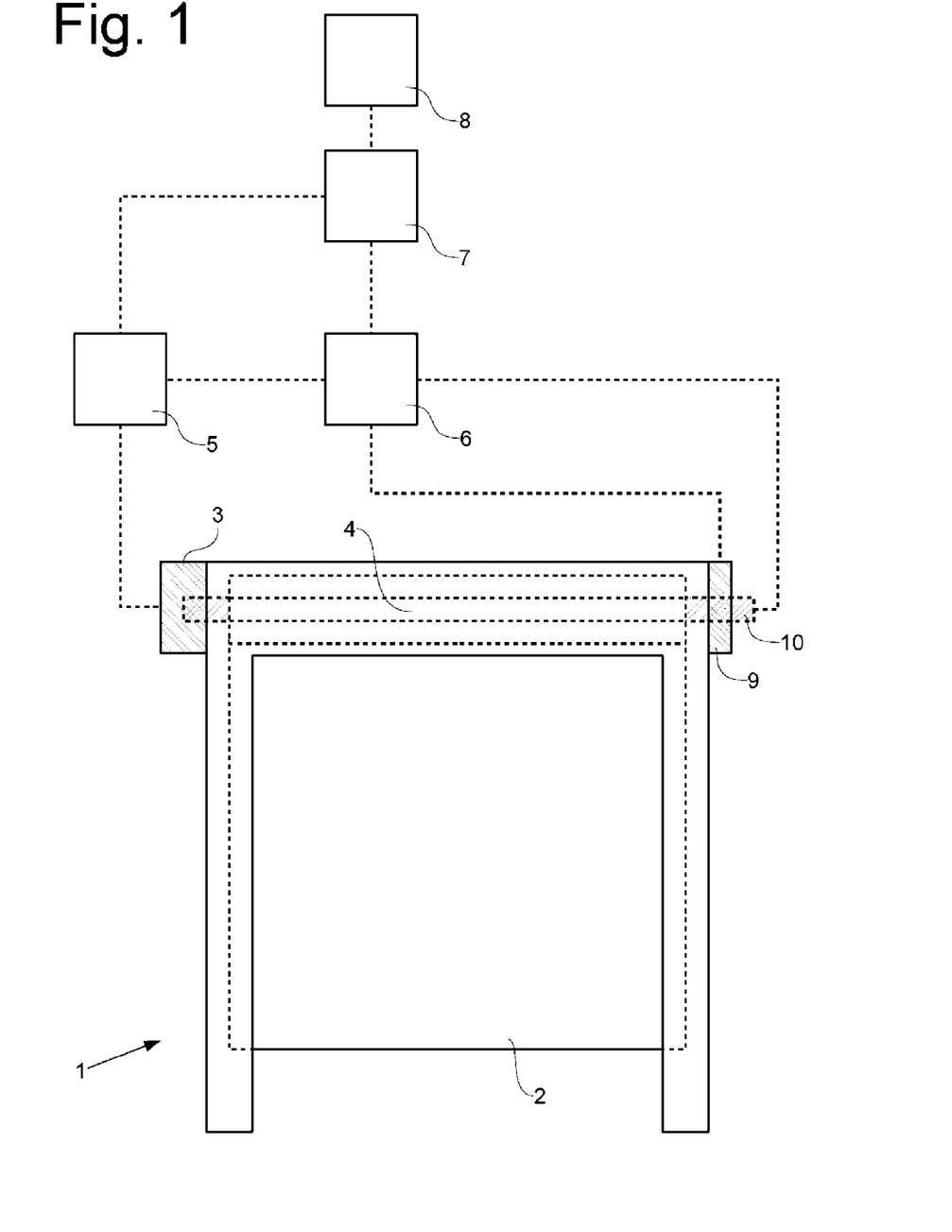
FIG. 1 shows the schematic configuration of a lifting gate according to one embodiment of the present invention.

FIG. 1 is a schematic view of a lifting gate according to an embodiment of the present invention. A power-operated gate 1 with a vertically moved gate leaf 2 exposed to gravity is shown which is moved up and down by a synchronous motor 3 and via a shaft 4. The drive is operated by a power regulating unit 5 which makes it possible in the manner described to perform the energized standstill operation of the motor.

A logic and control unit 6 generates the control commands for the regulating unit based on command sensor signals and coordinates the modes of operation of the regulating unit with the other control components.

Instead of the shaft 4 shown here, the gate leaf can also be received in separate spiral guide tracks provided on both sides of the gate leaf, which are presently not shown, so that a conventional winding shaft accommodating the gate leaf can be dispensed with.

The present invention is not restricted to the use of a synchronous motor as a drive motor. Instead of the synchronous motor, any motor can be used that can be regulated to zero rotational speed and at zero rotational speed also generates a sufficient amount of torque, as for example, stepping motors, reluctance motors, and the like.

FIG. 1 also shows an accumulator unit 7 which can be charged with recuperated energy. Furthermore, the accumulator unit can additionally be charged via an external power supply 8.

FIG. 1 also shows an electromechanical brake 9 acting upon the gate drive shaft and a position measuring system 10 embodied as an incremental encoder, absolute value transducer, or the like, which is also positioned directly on the shaft, where ideally both the brake as well as the position measuring system can be integrally formed with the drive.

The drive is actuated by a control unit such that its rotational speed (and therefore the speed of the gate leaf) follows pre-set ramps. All moving parts are subject to approximately uniform accelerations. The mechanical loads on shafts and brakes are therefore reduced both during regular gate movement as well as during reversal and emergency stop operations, but also during power failures.

Figure 2:
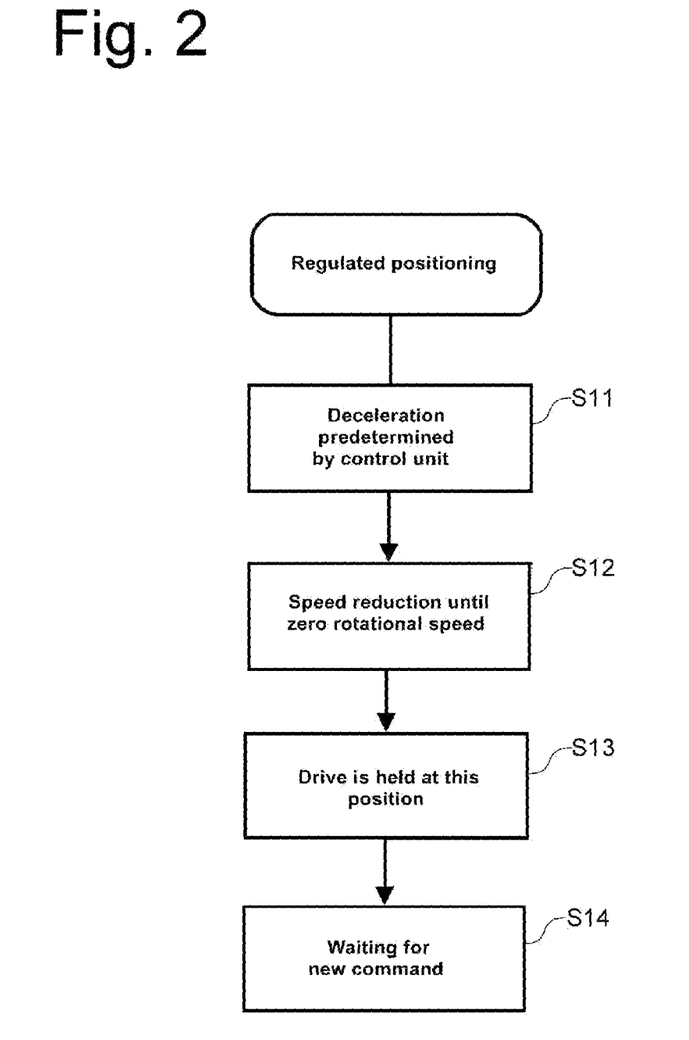
FIG. 2 shows a schematic flow diagram illustrating the operation of the lifting gate according to the invention of FIG. 1.

FIG. 2 shows a schematic flow diagram illustrating the operation of the lifting gate according to the invention of FIG. 1. In the event of a stop being requested, the motor is regulated quickly, reduced down to zero rotational speed and held at this position.

In step S11, a deceleration with which the gate leaf is to be braked is predetermined by the control unit. In step S12, the gate leaf drive is actuated on the basis of the predetermined deceleration in order to reduce the speed to zero rotational speed. The gate leaf is then held at the position reached (step S13). The control unit then in step S14 awaits new commands.

Figure 3:
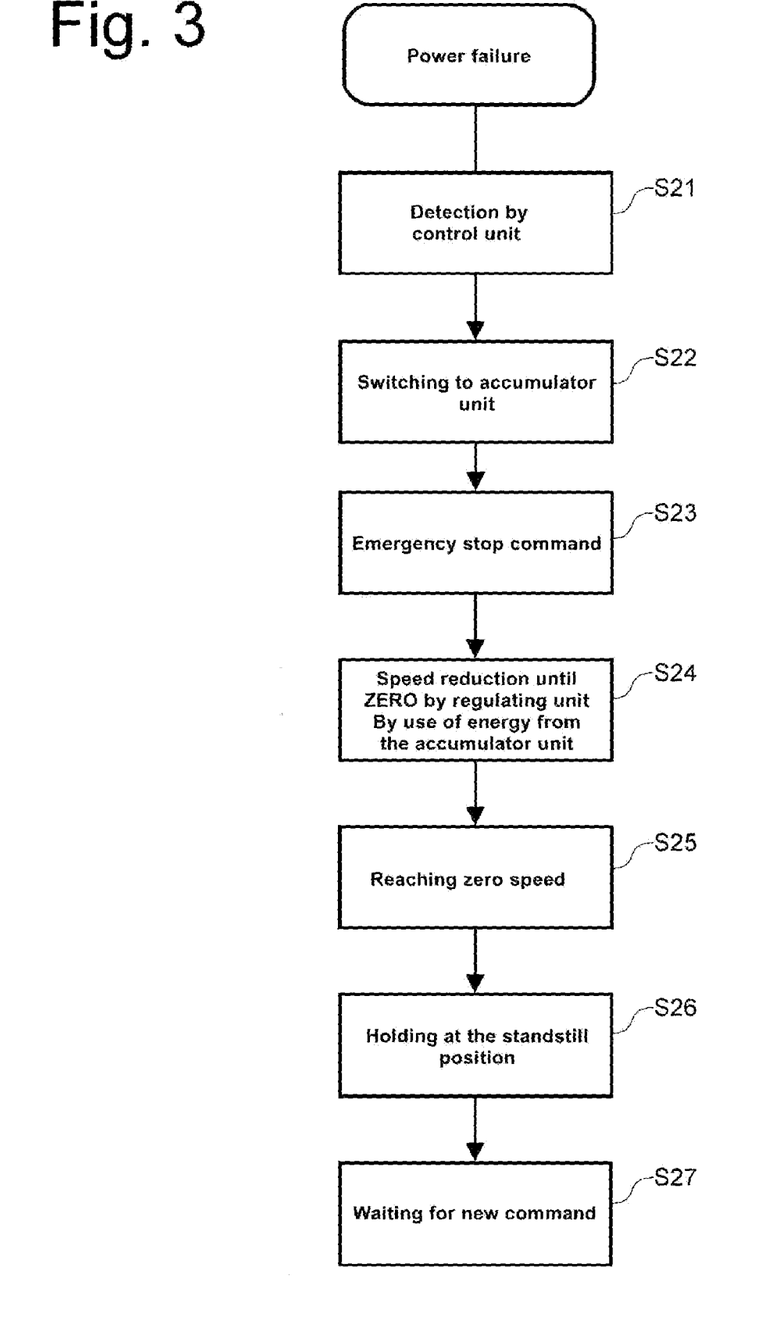
FIG. 3 shows a schematic flow diagram illustrating the operation of the lifting gate according to the invention of FIG. 1 in the event of power failure.

FIG. 3 shows a schematic flow diagram illustrating the operation of the lifting gate according to the invention of FIG. 1 in the event of power failure. In the event of power failure, this is in step S21 detected by the control unit and interpreted as an (emergency) stop command (step S23). The control unit can for this be equipped with an appropriate monitoring device that continuously monitors the main power supply (e.g. grid voltage) and in the event of failure or interruption of the main power supply switches to an emergency power supply (e.g. accumulator unit) (step S22). The electrical energy stored in the accumulator unit is then via the regulating unit by way of guided speed reduction used to make the drive come to a standstill (zero speed) (step S24). Once the gate leaf has reached zero speed (step S25), the gate leaf is held at the standstill position by the energized drive (step S26). The control unit then in step S27 awaits new commands.

In the embodiment shown in FIG. 3, complex mechanical brakes for preventing gate leaf crashes can be dispensed with despite power failure. The safety functions are assumed by controlled motor-driven braking of the gate leaf by use of the energy stored in the accumulator unit.

Loss of the safety function due to failing mechanical brakes can thereby be ruled out.

Figure 4:
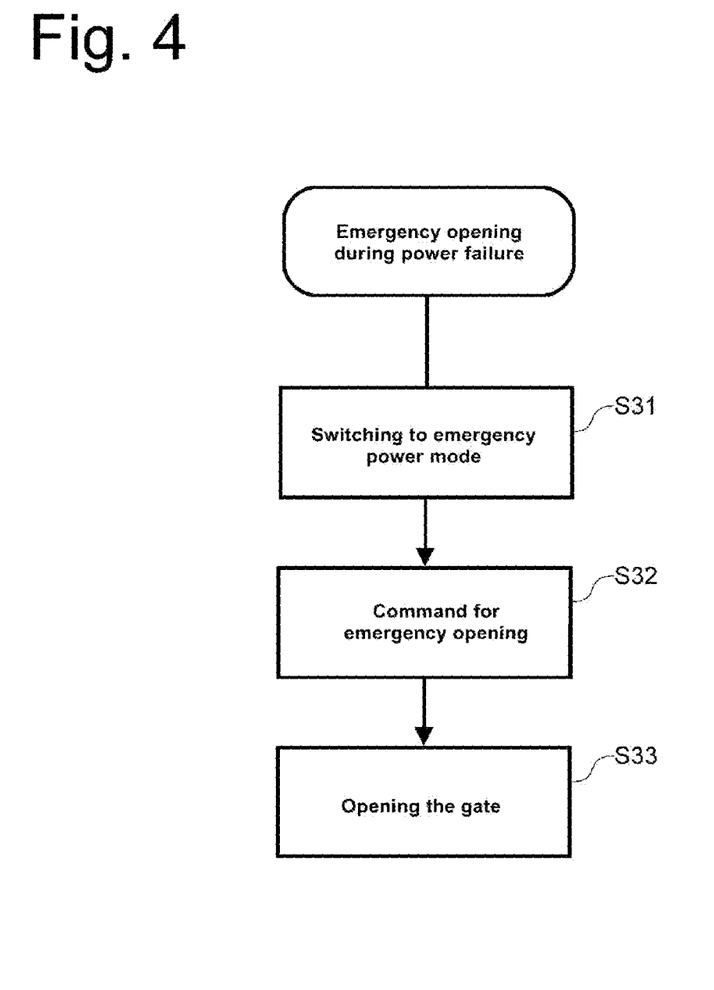
FIG. 4 shows a schematic flow diagram illustrating the operation of the lifting gate according to the invention of FIG. 1 in the event of an emergency opening of the gate.

FIG. 4 shows a schematic flow diagram illustrating the operation of the lifting gate according to the invention of FIG. 1 for performing an emergency opening of the gate during power failure.

The energy stored in the accumulator unit can in the absence of an external power supply be used to have the regulating unit perform a controlled emergency opening of the gate. If the control unit detects that no external power supply is available, then it can switch to a so-called emergency power mode (step S31). Unneeded circuitry is then shut down in order to save energy. If a command is received in step S32 to perform an emergency opening, then the gate is opened in step S33. The control unit and the drive motor are by the accumulator unit for this purpose supplied with electrical energy, where the available power may well be less than with the external power supply.

The emergency mode speed is adjusted accordingly so that the accumulator capacity can be kept low. The emergency power program can be adapted to the existing residual capacity of the accumulator unit, so that preferably complete opening of the gate is achieved.

The emergency opening can be triggered by manually operating a trigger button, by a fire alarm system coupled thereto, or automatically during power failure. Other kinds of trigger mechanisms are conceivable.

Figure 5:
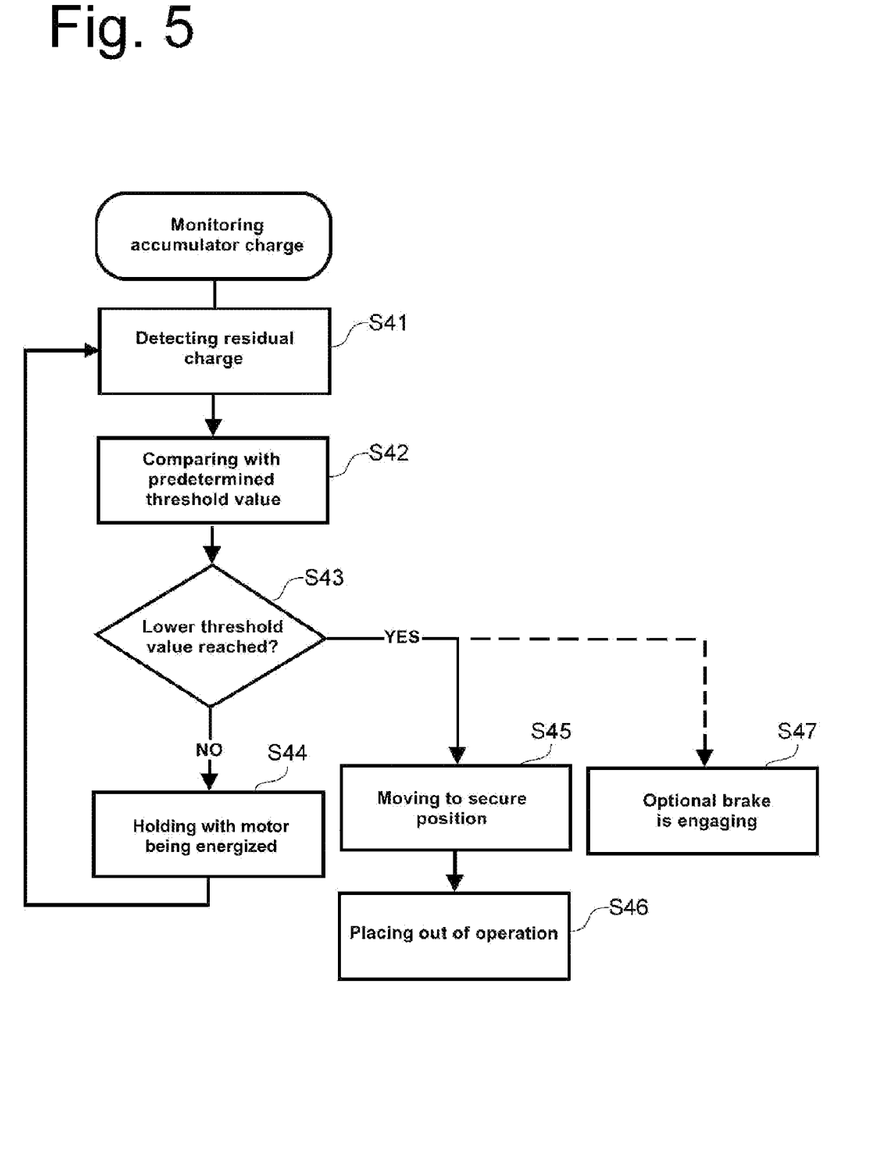
FIG. 5 shows a schematic flow diagram illustrating the operation of the lifting gate according to the invention of FIG. 1 for monitoring the residual accumulator charge.

FIG. 5 shows a schematic flow diagram illustrating the operation of the lifting gate according to the invention of FIG. 1 for monitoring the residual accumulator charge.

As already mentioned, the control device is in a favorable manner configured to monitor the residual accumulator charge and, when it drops below a predetermined lower threshold value, uses the remaining energy to move the gate leaf into a secure position. For this, the charge remaining in the accumulator unit is detected in step S41 and compared with a predetermined lower threshold value (step S42). As long as the threshold value is not reached, the motor current is maintained and the gate leaf is held at the current position (step S44). If, however, the lower threshold value is reached, then the gate leaf is in step S45 brought into a secure position. Depending on the configuration, this can be a fully opened or a fully closed position. The lifting gate is then maintained non-operational in this position until power is restored (step S46). As a further optional measure to protect from failure of the accumulator unit, a holding brake can be activated (step S47). In addition, the control device can advantageously be configured such that a motion of the gate leaf can be detected by the position data detection while the holding brake is to prevent such motion, and the drive motor is in response to the detection of such a motion actuated with zero rotational speed in order to additionally hold the gate leaf in a motor-driven manner. Furthermore, the control unit can be configured to use the position data detection for a comparison of reference and actual speeds and to correct any deviation within a control loop or bring about a standstill. Hazardous motions can thereby be counteracted.

The electrical energy provided by the accumulator unit can also be used for the purpose of keeping the position data detection of the control unit running also during failure of the external power supply. It is in the emergency power mode thereby also possible to detect downwardly hazardous motions and to counteract the motion.

Figure 6:
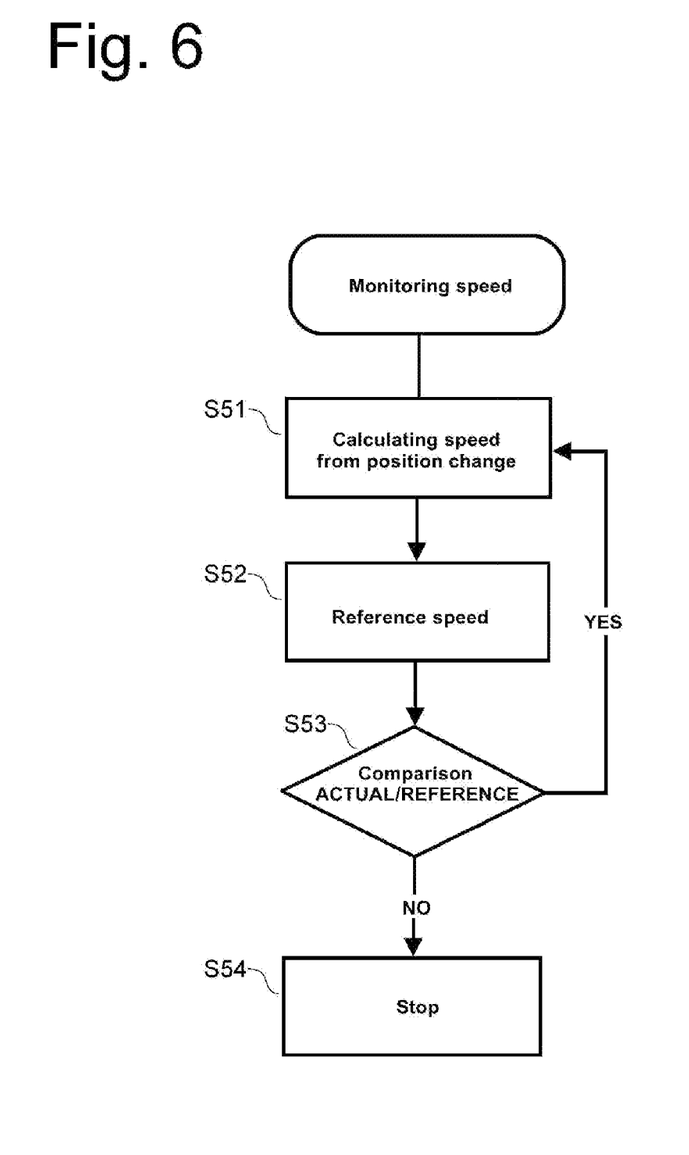
FIG. 6 shows a schematic flow diagram illustrating the operation of the lifting gate according to the invention of FIG. 1 for continuously monitoring the position and/or speed of the drive motor or of the gate leaf, respectively.

FIG. 6 shows a schematic flow diagram illustrating the operation of the lifting gate according to the invention of FIG. 1 for continuously monitoring the position and/or speed of the drive motor or of the gate leaf, respectively. The speed of the gate leaf can in step S51 be determined via the change in position of the gate leaf or the gate leaf drive that is detected by the position sensors. It is in step S53 compared with a predetermined reference speed (step S52). If the actual speed and the reference speed match, then the method is continued in step S51. If the actual speed and the reference speed differ, then the gate leaf can in step S54 be halted, or an emergency stop as described in the context of FIG. 2 can be initiated. By continuously monitoring the position and/or speed of the drive motor or the gate leaf, respectively, a hazardous downwardly motion can thereby be recognized and be counteracted. The security against preventing a crash is thereby increased.

The present invention therefore provides a drive unit for high-speed lifting gates in which a drive motor is provided for moving the gate leaf and can be down-regulated up to zero rotational speed. The drive motor is actuated via a control unit. Following the occurrence of an emergency stop condition, the drive motor is actuated such that its rotational speed is reduced to zero in a controlled manner and the gate leaf is thereby braked in a motor-driven manner. When the gate leaf is at a standstill, the gate leaf is held by the energized drive motor at zero rotational speed at the holding position. It is with an emergency power supply ensured that, also in the event of a power failure, motor-driven deceleration of the gate leaf and an emergency opening can occur.

The invention claimed is:

1. A drive and control system for a lifting gate with a vertically moveable gate leaf, comprising:
a drive motor coupled directly to said gate leaf and adapted to vertically move said gate leaf,
a control unit for actuating said drive motor,
a power regulating unit for regulating said drive motor, and
an accumulator unit, and
wherein said drive motor is a synchronous motor capable of being down-regulated to zero rotational speed and configured to provide sufficient torque directly to said gate leaf at zero rotational speed to hold said gate leaf at a current position,
wherein said control unit actuates said drive motor upon the occurrence of a stop condition such that its rotational speed is reduced in a controlled manner and said gate leaf is thereby braked in a motor-driven manner, and to activate a holding brake after the drive motor has reached zero rotational speed, and
wherein said accumulator unit provides said drive motor, said control unit and said power regulating unit with electrical energy during a power failure to ensure the operation of reducing the drive motor's rotational speed in the controlled manner and the holding of the gate leaf at the current position.

2. The drive system according to claim 1 wherein said accumulator unit is charged with electrical energy recuperated from said drive motor when the drive motor is actuated such that its rotational speed is reduced in said controlled manner.

3. The drive system according to claim 1, wherein said control unit is adapted to detect the power failure and to initiate an emergency stop operation when the power failure is detected.

4. The drive system according to claim 1, wherein said drive system is equipped with a position sensor for detecting a position of said gate leaf.

5. The drive system according to claim 1, wherein said control unit is adapted to drive said gate leaf into a secure and crash-safe position when a predetermined lower threshold value of a residual charge of said accumulator unit is reached.

6. The drive system according to claim 1, wherein said control unit is adapted to activate the holding brake when a predetermined lower threshold value of a residual charge of said accumulator unit is reached.

7. A lifting gate with a vertically movable gate leaf and a drive system according to claim 1.

* * * * *